(12) United States Patent
Cain

(10) Patent No.: US 11,894,200 B2
(45) Date of Patent: Feb. 6, 2024

(54) LOW INDUCTANCE ELECTROLYTIC CAPACITOR

(71) Applicant: AVX Corporation, Fountain Inn, SC (US)

(72) Inventor: Jeffrey Cain, Greenville, SC (US)

(73) Assignee: KYOCERA AVX Components Corporation, Fountain Inn, SC (US)

(*) Notice: Subject to any disclaimer, the term of this patent is extended or adjusted under 35 U.S.C. 154(b) by 0 days.

(21) Appl. No.: 17/465,933

(22) Filed: Sep. 3, 2021

(65) Prior Publication Data

US 2022/0093343 A1     Mar. 24, 2022

Related U.S. Application Data

(60) Provisional application No. 63/082,055, filed on Sep. 23, 2020.

(51) Int. Cl.
| | |
|---|---|
| *H01G 9/08* | (2006.01) |
| *H01G 9/15* | (2006.01) |
| *H01G 9/012* | (2006.01) |
| *H01G 9/028* | (2006.01) |
| *H01G 9/052* | (2006.01) |
| H01G 9/04 | (2006.01) |

(52) U.S. Cl.
CPC .............. *H01G 9/15* (2013.01); *H01G 9/012* (2013.01); *H01G 9/028* (2013.01); *H01G 9/0525* (2013.01); *H01G 9/08* (2013.01); *H01G 2009/05* (2013.01)

(58) Field of Classification Search
CPC ........ H01G 9/15; H01G 9/028; H01G 9/0525; H01G 9/08; H01G 2009/05
See application file for complete search history.

(56) References Cited

U.S. PATENT DOCUMENTS

| | | | | |
|---|---|---|---|---|
| 5,184,287 A | * | 2/1993 | Taniguchi | H01G 9/012 363/45 |
| 6,741,451 B2 | | 5/2004 | Aoyama | |
| 8,289,679 B2 | * | 10/2012 | Cheng | H01G 9/28 361/523 |
| 9,514,891 B2 | | 12/2016 | Djebara et al. | |
| 2003/0053286 A1 | * | 3/2003 | Masuda | H01G 9/10 361/523 |
| 2003/0223180 A1 | * | 12/2003 | Aoyama | H01G 9/15 361/523 |
| 2004/0021534 A1 | * | 2/2004 | Arai | H01P 1/20 333/204 |

(Continued)

OTHER PUBLICATIONS

International Search Report and Written Opinion for PCT/US2021/049627 dated Dec. 30, 2021, 10 pages.

*Primary Examiner* — David M Sinclair
(74) *Attorney, Agent, or Firm* — Dority & Manning, P.A.

(57) ABSTRACT

A capacitor that is capable of exhibiting good electrical properties under a wide variety of different conditions is provided. The capacitor contains a capacitor element that includes a sintered porous anode body, a dielectric that overlies the anode body, and a solid electrolyte that overlies the dielectric and includes a conductive polymer. The capacitor also contains multiple exposed anode lead portions that are electrically connected to respective anode terminations and a planar cathode termination that is electrically connected to the solid electrolyte.

17 Claims, 4 Drawing Sheets

(56) References Cited

U.S. PATENT DOCUMENTS

| | | | |
|---|---|---|---|
| 2006/0285276 A1* | 12/2006 | Kuriyama | H01G 9/012 361/523 |
| 2007/0188982 A1* | 8/2007 | Kuriyama | H01G 9/012 29/25.03 |
| 2008/0094780 A1* | 4/2008 | Kuriyama | H01G 9/012 361/523 |
| 2008/0218944 A1 | 9/2008 | Kuriyama | |
| 2008/0247122 A1 | 10/2008 | Vaisman et al. | |
| 2014/0334069 A1* | 11/2014 | Petrzilek | H01G 9/0032 427/80 |
| 2015/0055277 A1* | 2/2015 | Djebara | H01G 9/15 29/25.03 |
| 2016/0012970 A1* | 1/2016 | Shin | H01G 9/008 361/540 |
| 2018/0254151 A1* | 9/2018 | Weaver | H01G 9/012 |
| 2019/0006113 A1 | 1/2019 | Wakatsuki et al. | |

* cited by examiner

LOW INDUCTANCE ELECTROLYTIC CAPACITOR

CROSS REFERENCE TO RELATED APPLICATION

The present application claims filing benefit of U.S. Provisional Patent Application Ser. No. 63/082,055 having a filing date of Sep. 23, 2020, which is incorporated herein by reference in its entirety.

BACKGROUND OF THE INVENTION

Decoupling capacitors are often used to manage noise problems that occur in circuit applications. They provide stable, local charge sources required to switch and refresh the logic gates used in various digital circuits. However, decoupling capacitors must now be able to perform at lower voltages and higher currents, requiring performance characteristics such as lower Equivalent Series Resistance (ESR), higher capacitance, and lower inductance (or ESL—Equivalent Series Inductance) within such capacitors to function at the level required in the diverse applications in the current landscape. Particularly, as switching speeds increase in electronic circuit applications, the need to reduce inductance becomes a serious limitation for improved system performance. Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte. Conductive polymers are often employed as the solid electrolyte due to their advantageous low equivalent series resistance and "non-burning/non-ignition" failure mode. However, while solid electrolytic capacitors provide distinct advantages in terms of ESR, solid electrolytic capacitors have not been able to withstand high frequency applications or exhibit the low inductance required for decoupling and high-speed switching. As such, a need currently exists for a solid electrolytic capacitor having an improved performance.

SUMMARY OF THE INVENTION

In accordance with one embodiment of the present invention, a solid electrolytic capacitor is disclosed that comprises a capacitor element comprising a sintered anode body, a dielectric that overlies the anode body, and a solid electrolyte that overlies the dielectric, wherein the solid electrolyte includes a conductive polymer, wherein the capacitor element defines opposing first and second ends and opposing upper and lower surfaces; a first exposed anode lead portion extending from the first end of the capacitor element; a first anode termination that is electrically connected to the first exposed anode lead portion; a second exposed anode lead portion extending from the second end of the capacitor element; a second anode termination that is spaced apart from the first anode termination and electrically connected to the second exposed anode lead portion; and a planar cathode termination that is positioned adjacent to the lower surface of the capacitor element and electrically connected to the solid electrolyte.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended figure in which:

FIG. 10 is a side view of one embodiment of an anode body according to the present invention;

DETAILED DESCRIPTION OF REPRESENTATIVE EMBODIMENTS

Figure 1A:
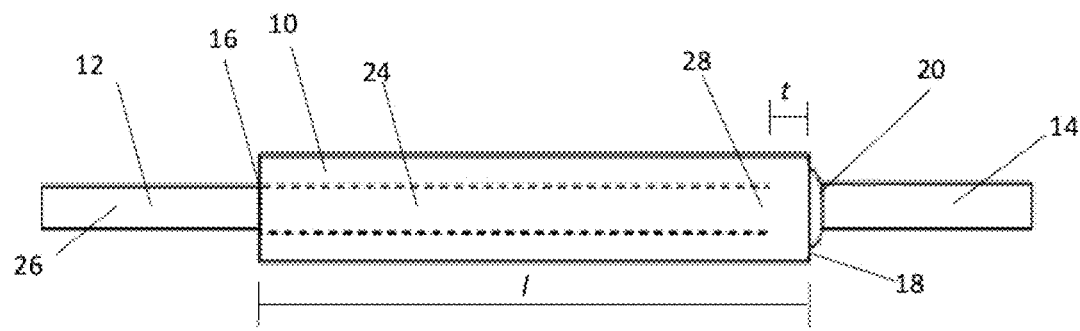
FIG. 1A is a side view of one embodiment of an anode body according to the present invention.

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor that is capable of exhibiting good electrical properties under a wide variety of different conditions. The capacitor contains a capacitor element that includes a sintered porous anode body, a dielectric that overlies the anode body, and a solid electrolyte that overlies the dielectric and includes a conductive polymer. The capacitor element contains opposing first and second ends and an opposing upper surface and lower surface. The capacitor also contains multiple anode lead portions that are electrically connected to respective anode terminations and a planar cathode termination that is positioned adjacent to the lower surface of the capacitor element and electrically connected to the solid electrolyte.

Through selective control over the particular configuration of the capacitor element and terminations, the resulting capacitor may exhibit low ESL values, such as about 1 nanohenry or less, in some embodiments about 750 picohenries or less, in some embodiments about 350 picohenries or less, in some embodiments from about 1 femtohenry to about 100 picohenries, and in some embodiments, from about 50 femtohenries to about 10 picohenries. The low ESL values may also be characterized by a low impedance value, which is a reflection of parasitic inductance. The impedance may, for example, be about 1 ohm or less, in some embodiments about 0.8 ohms or less, in some embodiments about 0.6 ohms or less, and in some embodiments, from about 1 mohm to about 0.3 ohms. Such low ESL (e.g., impedance) may also be exhibited even a broad range of frequencies, such as from 1 kHz to about 100 MHz, in some embodiments from about 100 kHz to about 100 MHz, and in some embodiments, from about 1 MHz to about 100 MHz. Minimizing parasitic inductance over a wide range of frequencies can contribute to good performance, in particular good decoupling performance, especially under high-speed transient conditions. In addition to exhibiting low ESL values, the capacitor may also exhibit low ESR values, such as about 800 mohms or less, in some embodiments about 600 mohms or less, in some embodiments about 500 mohms or less, in some embodiments about 350 mohms or less, in some embodiments from about 0.01 to about 250 mohms, and in some embodiments, from about 0.1 to about 150 mohms, measured at an operating frequency of 100 kHz and temperature of 23° C.

Notably, the low ESR and ESL values can still remain stable even at high temperatures and/or high humidity levels. For example, the capacitor may exhibit ESR and/or ESL values within the ranges noted above even after being exposed to a temperature of from about 80° C. or more, in some embodiments from about 85° C. to about 180° C., and in some embodiments, from about 850° C. to about 150° C. (e.g., about 85° C., 105° C., 125° C., or 150° C.) and/or a relative humidity level of about 40% or more, in some embodiments about 45% or more, in some embodiments about 50% or more, and in some embodiments, about 70% or more (e.g., about 85% to 100%) for a substantial period of time as noted above. Relative humidity may, for instance, be determined in accordance with ASTM E337-02, Method A (2007). The time period for exposure to the high temperature and/or humidity level may be about 100 hours or more, in some embodiments from about 150 hours to about 3,000 hours, and in some embodiments, from about 200 hours to about 2,500 hours (e.g., 250, 500, 750, or 1,000 hours). For example, the ESR of the capacitor after being exposed to a high temperature (e.g., about 85° C.) and/or humidity level (e.g., about 85%) for 500 hours may be about 1,500 mohms or less, in some embodiments about 1,000 mohms or less, in some embodiments about 800 mohms or less, in some embodiments about 600 mohms or less, in some embodiments from about 0.01 to about 500 mohms, and in some embodiments, from about 0.1 to about 200 mohms, measured at an operating frequency of 100 kHz and temperature of 23° C. Likewise, the ratio of the ESR of the capacitor after being exposed to a high temperature (e.g., about 85° C.) and/or humidity level (e.g., about 85%) for 500 hours to the initial DCL of the capacitor (e.g., at about 23° C.) may be about 10 or less, in some embodiments about 5 or less, in some embodiments about 3 or less, in some embodiments about 2 or less, and in some embodiments, from about 0.9 to about 1.5.

Due to its ability to provide a combination of low ESL and ESR values, the resulting capacitor may be uniquely positioned to provide robust broadband decoupling and high speed switching. For instance, a single capacitor according to the present invention may be used to replace multiple lower capacitance, or limited frequency decoupling capacitors, allowing the capacitor to utilize less space, such as having a smaller height, further improving miniaturization.

The capacitor may exhibit excellent DC power filtering, such as illustrated by excellent attenuation over a broad range of frequencies. As known in the art, insertion loss measures power transfer between terminations, if the power increases, gain is exhibited, where if power is decreased between the terminals, attenuation is exhibited. Thus, the capacitor may exhibit high attenuation over a broad frequency range, allowing a broad range of frequencies to be well filtered. For instance, the capacitor may exhibit about attenuation ($S_{21}$ parameter) of about 15 dB or more, in some embodiments about 25 dB or more, in some embodiments about 30 dB or more, in some embodiments from about 35 dB to about 70 dB, and in some embodiments, from about 50 dB to about 70 dB. Such attenuation may be exhibited over a wide frequency range. For example, at low frequencies ranging from about 0.1 MHz to about 500 MHz, and in some cases, from about 1 MHz to about 100 MHz, the capacitor may exhibit attenuation ($S_{21}$ parameter) of about 40 dB or more, in some embodiments about 50 dB or more, in some embodiments about 55 dB or more, and in some embodiments, from about 60 dB to about 70 dB. Likewise, at high frequencies ranging from about 500 MHz to about 10 GHz, and in some cases from about 1 GHz to about 5 GHz, the capacitor may exhibit attenuation ($S_{21}$ parameter) of about 20 dB or more, in some embodiments about 25 dB or more, in some embodiments about 30 dB or more, and in some embodiments, from about 30 dB to about 60 dB. Among other things, such attenuation may allow the capacitor to be readily employed in DC power filtering applications. Furthermore, the capacitor may perform consistently across a wide range of temperatures. For instance, in one embodiment, the capacitor may vary about 5 dB or less over a large temperature range, such as a change in temperature of about 25° C. or greater, in some embodiments about 50° C., or greater, and in some embodiments, about 70° C. or greater.

The capacitor may also exhibit other beneficial electrical properties. For example, the capacitor may exhibit a low leakage current ("DCL") over a wide variety of conditions. Furthermore, after being subjected to an applied voltage (e.g., 16 volts) at a temperature of about 23° C. for a certain period of time (e.g., from about 30 minutes to about 20 hours, in some embodiments from about 1 hour to about 18 hours, and in some embodiments, from about 4 hours to about 16 hours), the capacitor may exhibit a DCL of about 10 microamps ("µA") or less, in some embodiments about 5 µA or less, in some embodiments about 1 µA or less, and in some embodiments, from about 0.01 to about 5 µA. In one embodiment, the DCL of the capacitor after being exposed to a high temperature (e.g., about 85° C.) and/or humidity level (e.g., about 85%) for 500 hours may also be about 10 µA or less, in some embodiments about 8 µA or less, in some embodiments about 6 µA or less, and in some embodiments, from about 0.1 to about 5 µA. Likewise, the ratio of the DCL of the capacitor after being exposed to a high temperature (e.g., about 85° C.) and/or humidity level (e.g., about 85%) for 500 hours to the initial DCL of the capacitor (e.g., at about 23° C.) may be about 20 or less, in some embodiments about 15 or less, in some embodiments about 10 or less, in some embodiments about 5 or less, and in some embodiments, from about 0.9 to about 4. The capacitor may also exhibit a dry capacitance of about 30 nanoFarads per square centimeter ("nF/cm$^2$") or more, in some embodiments about 100 nF/cm$^2$ or more, in some embodiments from about 200 to about 3,000 nF/cm$^2$, and in some embodiments, from about 400 to about 2,000 nF/cm$^2$, measured at a frequency of 120 Hz at temperature of 23° C. The actual capacitance may vary, such as from about 10 µF to about 1,000 µF, in some embodiments from about 50 µF to about 500 µF, and in some embodiments, from about 60 µF to about 250 µF. Similar to the DCL and ESR values, the capacitance can also remain stable at the high temperature and/or humidity level ranges noted above. In one embodiment, for example, the ratio of the capacitance value of the capacitor after being exposed to a high temperature (e.g., about 85° C.) and/or humidity level (e.g., about 85%) for 500 hours to the initial capacitance value of the capacitor (e.g., at about 23° C.) may be about 3.0 or less, in some embodiments about 2.0 or less, in some embodiments about 1.8 or less, in some embodiments about 1.6 or less, and in some embodiments, from about 0.9 to about 1.3.

It is also believed that the dissipation factor of the capacitor may be maintained at relatively low levels. The dissipation factor generally refers to losses that occur in the capacitor and is usually expressed as a percentage of the ideal capacitor performance. For example, the dissipation factor of the capacitor is typically about 250% or less, in some embodiments about 200% or less, and in some embodiments, from about 1% to about 180%, as determined at a frequency of 120 Hz.

Various embodiments of the invention will now be described in more detail.

I. Capacitor Element

A. Anode Body

The anode body is formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The specific charge of the powder typically varies from about 5,000 to about 800,000 microFarads*Volts per gram ("$\mu F*V/g$") depending on the desired application. For instance, in certain embodiments, a high charge powder may be employed that has a specific charge of from about 100,000 to about 600,000 $\mu F*V/g$, in some embodiments from about 120,000 to about 500,000 $\mu F*V/g$, and in some embodiments, from about 150,000 to about 400,000 $\mu F*V/g$. In other embodiments, a low charge powder may be employed that has a specific charge of from about 5,000 to about 100,000 $\mu F*V/g$, in some embodiments from about 8,000 to about 90,000 $\mu F*V/g$, and in some embodiments, from about 10,000 to about 80,000 $\mu F*V/g$. As is known in the art, the specific charge may be determined by multiplying capacitance by the anodizing voltage employed, and then dividing this product by the weight of the anodized electrode body.

In one embodiment, for instance, the powder is formed from tantalum. If desired, a reduction process may be employed in which a tantalum salt (e.g., potassium fluorotantalate ($K_2TaF_7$), sodium fluorotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The powder may be a free-flowing, finely divided powder that contains primary particles. The primary particles of the powder generally have a median size (D50) of from about 5 to about 250 nanometers, in some embodiments from about 10 to about 200 nanometers, and in some embodiments, from about 20 to about 150 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc. If desired, the powder may also be doped with sinter retardants in the presence of a dopant, such as aqueous acids (e.g., phosphoric acid). The amount of the dopant added depends in part on the surface area of the powder, but is typically present in an amount of no more than about 200 parts per million ("ppm"). The dopant may be added prior to, during, and/or subsequent to agglomeration. The powder may also be subjected to one or more deoxidation treatments. For example, the powder may be exposed to a getter material (e.g., magnesium), such as described in U.S. Pat. No. 4,960,471. The temperature at which deoxidation of the powder occurs may vary, but typically ranges from about 700° C. to about 1,600° C., in some embodiments from about 750° C. to about 1,200° C., and in some embodiments, from about 800° C. to about 1,000° C. The total time of the deoxidation treatment(s) may range from about 20 minutes to about 3 hours.

The resulting powder has certain characteristics that enhance its ability to be formed into a capacitor anode. For example, the powder typically has a specific surface area of from about 0.5 to about 10.0 $m^2/g$, in some embodiments from about 0.7 to about 5.0 $m^2/g$, and in some embodiments, from about 2.0 to about 4.0 $m^2/g$. Likewise, the bulk density of the powder may be from about 0.1 to about 0.8 grams per cubic centimeter ($g/cm^3$), in some embodiments from about 0.2 to about 0.6 $g/cm^3$, and in some embodiments, from about 0.4 to about 0.6 $g/cm^3$.

Once the powder is formed, it is then generally compacted or pressed to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder is typically pressed to a density of from about 0.5 to about 20 g/cm³, in some embodiments from about 1 to about 15 g/cm³, and in some embodiments, from about 2 to about 10 g/cm³.

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. After binder removal, the anode body may be subjected to an optional deoxidation process. In one embodiment, for example, the deoxidation process includes exposing the anode body to a getter material (e.g., magnesium, titanium, etc.) that is capable of removing oxygen from the anode body by chemical reaction, adsorption, etc. More particularly, the anode body is initially inserted into an enclosure (e.g., tantalum box) that also contains the getter material. The atmosphere within the enclosure is typically an inert atmosphere (e.g., argon gas). To initiate the deoxidation, the atmosphere within the enclosure is heated to a temperature that is sufficient to melt and/or vaporize the getter material and deoxidize the anode body. The temperature may vary depending on the specific charge of the anode powder, but typically ranges from about 700° C. to about 1,200° C., in some embodiments from about 750° C. to about 1,100° C., and in some embodiments, from about 800° C. to about 1,000° C. The total time of deoxidation may range from about 20 minutes to about 3 hours. This may occur in one or more steps. Upon completion of the deoxidation, the getter material typically vaporizes and forms a precipitate on a wall of the enclosure. To ensure removal of the getter material, the anode body may also be subjected to one or more acid leaching steps, such as with a solution of nitric acid, hydrofluoric acid, hydrogen peroxide, sulfuric acid, water, etc., or a combination thereof.

The resulting anode body may thus have a relatively low oxygen content. For example, the anode body may have no more than about 5,500 ppm oxygen, in some embodiments no more than about 5,000 ppm oxygen, and in some embodiments, from about 500 to about 4,500 ppm oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

After optional deoxidation, the anode body may be sintered to form a porous, integral mass. The anode body is typically sintered at a temperature of from about 700° C. to about 1,600° C., in some embodiments from about 800° C. to about 1,500° C., and in some embodiments, from about 900° C. to about 1,200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed. As noted above, sintering of the anode body generally occurs after any optional deoxidation. It should be understood, however, that the anode body may also be subjected to one or more pre-sintering steps prior to oxidation to help provide the desired degree of green strength for the deoxidation process. Such pre-sintering steps may be conducted under the same or different conditions as the sintering process that occurs after deoxidation. For example, pre-sintering may occur in one or more steps at a temperature of from about 700° C. to about 1,600° C., in some embodiments from about 800° C. to about 1,500° C., and in some embodiments, from about 900° C. to about 1,200° C., for a time of from about 5 minutes to about 100 minutes, and in some embodiments, from about 8 minutes to about 15 minutes. Pre-sintering may also occur in a reducing atmosphere, such as in a vacuum, inert gas, hydrogen, etc., as described above.

As indicated above, the capacitor also contains multiple anode lead portions that are electrically connected to respective anode terminations. The anode lead portions may be formed as part of a single anode lead (e.g., opposing ends) or as part of separate anode leads. The anode lead(s) may have any desired shape and size and may be in the form of a wire, sheet, etc. Typically, the anode lead(s) extend in a longitudinal direction from the anode body and are formed from any electrically conductive material, such as tantalum, niobium, aluminum, hafnium, titanium, etc., as well as electrically conductive oxides and/or nitrides of thereof. Connection of the lead(s) to the anode body may be accomplished using any known technique, such as by welding the one or more leads to the body or embedding the one or more anode leads within the anode body during formation (e.g., prior to compaction and/or sintering).

Referring to FIG. 1A, one embodiment of an anode body 10 is shown that has a first anode lead 12 having an embedded portion 24 positioned within the anode body and an exposed first anode lead portion 26 extending from a first end 16 of the anode body 10. A second exposed anode lead portion 14 is likewise connected (e.g., by weld 20) to a second end 18 of the anode body 10. As shown in FIG. 1A, the second exposed anode lead portion 14 is formed as part of a separated, second anode lead extending from a second end 18 of the anode body.

Figure 1B:
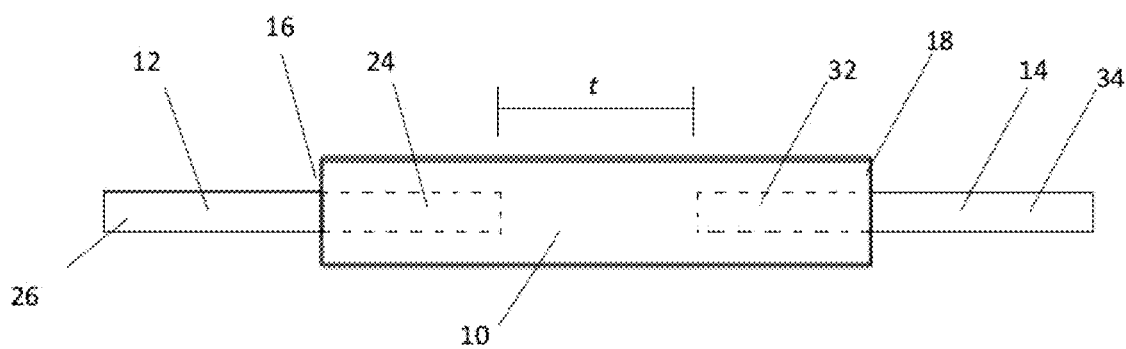
FIG. 1B is a side view of one embodiment of an anode body according to the present invention.
Figure 1C:
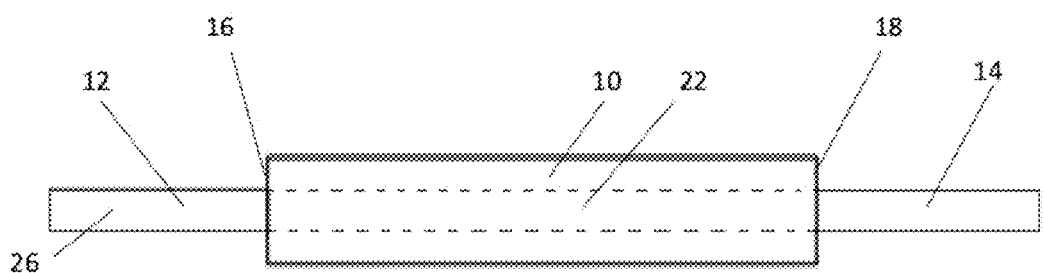

Of course, as shown in FIG. 1C, first exposed anode lead portion 26 and second exposed anode lead portion 14 may also be defined by opposing portions of a single, continuous anode lead 22 that extends through both ends 16 and 18 of the anode body 10. Regardless, it is typically desired that the exposed anode lead portions extend from opposing ends of the anode body in generally the same plane. Referring again to FIG. 1A, a gap may optionally exist between the embedded end of the first anode lead and the end of the anode body so that the electrical connection between the first and second anode leads is provided through the sintered anode body. In FIG. 1A, for instance, this gap may be defined as a distance "t" between the end 18 of the anode body and the embedded end 28 of the anode lead, which typically ranges from about 0.2 to about 5 millimeters, in some embodiments from about 0.4 to about 4 millimeters, and in some embodiments, from about 0.5 to about 2 millimeters. The length of the anode "l" may likewise range from about 1.5 to about 6 millimeters, and in some embodiments, from about 2 to about 5 millimeters. In such embodiments, the ratio of the distance "t" to the length "l" may also range from about 0.1 to about 0.8, in some embodiments from about 0.2 to about 0.7, and in some embodiments, from about 0.3 to about 0.6.

Another embodiment is shown in FIG. 1B in which an anode body 10 has a first anode lead 12 having an embedded portion 24 positioned within the anode body and an exposed first anode lead portion 26 extending from a first end 16 of the anode 10. A second anode lead 14 having an embedded portion 32 positioned within the anode body and an exposed second anode lead portion 34 extending from a second end 18 of the anode body 10. Thus, in this embodiment, the need for a welded portion for the second anode lead is not required. Similar to the embodiment noted above, a gap "t" may optionally exist between the embedded end of the first anode lead and the embedded end of the second anode lead, which may be within the ranges noted above.

B. Dielectric

The anode body is coated with a dielectric. The dielectric may be formed by anodically oxidizing ("anodizing") the sintered anode body so that a dielectric layer is formed over and/or within the anode body. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current may be passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The forming voltage employed during anodization is generally about 20 volts or more, in some embodiments about 30 volts or more, in some embodiments about 35 volts or more, and in some embodiments, from about 35 to about 70 volts, and at temperatures ranging from about 10° C. or more, in some embodiments from about 20° C. to about 200° C., and in some embodiments, from about 30° C. to about 100° C. The resulting dielectric layer may be formed on a surface of the anode and within its pores.

By selectively controlling the particular manner in which the anode body is formed, the resulting capacitor can exhibit a high degree of dielectric strength, which can improve capacitance stability. The "dielectric strength" generally refers to the ratio of the "breakdown voltage" of the capacitor (voltage at which the capacitor fails in volts, "V") to the thickness of the dielectric (in nanometers, "nm"). The capacitor typically exhibits a dielectric strength of about 0.4 V/nm or more, in some embodiments about 0.45 V/nm or more, in some embodiments about 0.5 V/nm or more, in some embodiments from about 0.55 to about 1 V/nm, and in some embodiments, from about 0.6 to about 0.9 V/nm. The capacitor may, for example, exhibit a relatively high breakdown voltage, such as about 30 volts or more, in some embodiments about 35 volts or more, in some embodiments about 50 volts or more, in some embodiments about 65 volts or more, in some embodiments about 85 volts or more, in some embodiments about 90 volts or more, in some embodiments about 95 volts or more, and in some embodiments, from about 100 volts to about 300 volts, such as determined by increasing the applied voltage in increments of 3 volts until the leakage current reaches 1 mA. While its thickness can generally vary depending on the particular location of the anode body, the "dielectric thickness" for purposes of determining dielectric strength is generally considered as the greatest thickness of the dielectric, which typically ranges from about 50 to about 500 nm, in some embodiments from about 80 to about 350 nm, and in some embodiments, from about 100 to about 300 nm. The dielectric thickness may be measured using Zeiss Sigma FESEM at 20,000× to 50,000× magnification, wherein the sample is prepared by cutting a finished part in plane perpendicular to the longest dimension of the finished part, and the thickness is measured at sites where the cut is perpendicular through the dielectric layer.

C. Pre-Coat Layer

Although by no means required, a pre-coat layer may optionally overly the dielectric that includes an organometallic compound. The organometallic compound may have the following general formula:

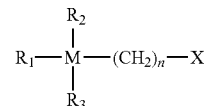

wherein,

M is an organometallic atom, such as silicon, titanium, and so forth;

$R_1$, $R_2$, and $R_3$ are independently an alkyl (e.g., methyl, ethyl, propyl, etc.) or a hydroxyalkyl (e.g., hydroxymethyl, hydroxyethyl, hydroxypropyl, etc.), wherein at least one of $R_1$, $R_2$, and $R_3$ is a hydroxyalkyl;

n is an integer from 0 to 8, in some embodiments from 1 to 6, and in some embodiments, from 2 to 4 (e.g., 3); and X is an organic or inorganic functional group, such as glycidyl, glycidyloxy, mercapto, amino, vinyl, etc.

In certain embodiments, $R_1$, $R_2$, and $R_3$ may a hydroxyalkyl (e.g., $OCH_3$). In other embodiments, however, $R_1$ may be an alkyl (e.g., $CH_3$) and $R_2$ and $R_3$ may a hydroxyalkyl (e.g., $OCH_3$).

Further, in certain embodiments, M may be silicon so that the organometallic compound is an organosilane compound, such as an alkoxysilane. Suitable alkoxysilanes may include, for instance, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, glycidoxymethyltrimethoxysilane, glycidoxymethyltriethoxysilane, glycidoxymethyltripropoxysilane, glycidoxymethyltributoxysilane, β-glycidoxyethyltrimethoxysilane, β-glycidoxyethyltriethoxysilane, β-glycidoxyethyltripropoxysilane, β-glycidoxyethyl-tributoxysilane, β-glycidoxyethyltrimethoxysilane, α-glycidoxyethyltriethoxysilane, α-glycidoxyethyltripropoxysilane, α-glycidoxyethyltributoxysilane, γ-glycidoxypropyltrimethoxysilane, γ-glycidoxypropyltriethoxysilane, γ-glycidoxypropyl-tripropoxysilane, γ-glycidoxypropyltributoxysilane, β-glycidoxypropyltrimethoxysilane, β-glycidoxypropyl-triethoxysilane, β-glycidoxypropyl-tripropoxysilane, α-glycidoxypropyltributoxysilane, α-glycidoxypropyltrimethoxysilane, α-glycidoxypropyltriethoxysilane, α-glycidoxypropyl-tripropoxysilane, α-glycidoxypropyltributoxysilane, γ-glycidoxybutyltrimethoxysilane, δ-glycidoxybutyltriethoxysilane, δ-glycidoxybutyltripropoxysilane, δ-glycidoxybutyl-tributoxysilane, δ-glycidoxybutyltrimethoxysilane, γ-glycidoxybutyltriethoxysilane, γ-glycidoxybutyltripropoxysilane, γ-propoxybutyltributoxysilane, δ-glycidoxybutyl-trimethoxysilane, δ-glycidoxybutyltriethoxysilane, δ-glycidoxybutyltripropoxysilane, α-glycidoxybutyltrimethoxysilane, α-glycidoxybutyltriethoxysilane, α-glycidoxybutyl-tripropoxysilane, α-glycidoxybutyltributoxysilane, (3,4-epoxycyclohexyl)-methyltrimethoxysilane, (3,4-epoxycyclohexyl)methyltriethoxysilane, (3,4-epoxycyclohexyl)methyltripropoxysilane, (3,4-epoxycyclohexyl)-methyltributoxysilane, (3,4-epoxycyclohexyl)ethyltrimethoxysilane, (3,4-epoxycyclohexyl)ethyltriethoxysilane, (3,4-epoxycyclohexyl)ethyltripropoxysilane, (3,4-epoxycyclohexyl)ethyltributoxysilane, (3,4-epoxycyclohexyl)propyltrimethoxysilane, (3,4-epoxycyclohexyl)propyltriethoxysilane, (3,4-epoxycyclohexyl)propyltripropoxysilane, (3,4-epoxycyclohexyl)propyltributoxysilane, (3,4-epoxycyclohexy)butyltrimethoxysilane, (3,4-epoxycyclohexy)butyltriethoxysilane, (3,4-epoxycyclohexyl)butyltripropoxysilane, (3,4-epoxycyclohexyl)butyltributoxysilane, and so forth.

The particular manner in which the pre-coat layer is applied to the capacitor body may vary as desired. In one particular embodiment, the compound is dissolved in an organic solvent and applied to the part as a solution, such as by screen-printing, dipping, electrophoretic coating, spraying, etc. The organic solvent may vary, but is typically an alcohol, such as methanol, ethanol, etc. Organometallic compounds may constitute from about 0.1 wt. % to about 10 wt. %, in some embodiments from about 0.2 wt. % to about 8 wt. %, and in some embodiments, from about 0.5 wt. % to about 5 wt. % of the solution. Solvents may likewise constitute from about 90 wt. % to about 99.9 wt. %, in some embodiments from about 92 wt. % to about 99.8 wt. %, and in some embodiments, from about 95 wt. % to about 99.5 wt. % of the solution. Once applied, the part may then be dried to remove the solvent therefrom and form a pre-coat layer containing the organometallic compound.

D. Solid Electrolyte

A solid electrolyte overlies the dielectric and optional pre-coat. The total thickness of the solid electrolyte is typically from about 1 to about 50 μm, and in some embodiments, from about 5 to about 20 μm. The solid electrolyte typically includes one or more layers of a conductive polymer (e.g., polyheterocycles, such as polypyrroles, polythiophenes, polyanilines, etc., polyacetylenes, poly-p-phenylenes, polyphenolates, etc.). Thiophene polymers are particularly suitable for use in the solid electrolyte. In certain embodiments, for instance, a thiophene polymer may be employed that has repeating units of the following formula (I):

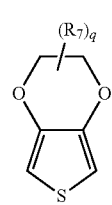

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0.

Particularly suitable thiophene polymers are those in which "D" is an optionally substituted $C_2$ to $C_3$ alkylene radical. For instance, the polymer may include optionally substituted poly(3,4-ethylenedioxythiophene), or derivatives thereof, which has repeating units of the following general formula (II):

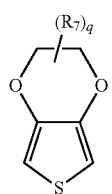

In one particular embodiment, "q" is 0. One commercially suitable example of 3,4-ethylenedioxthiophene is available from Heraeus under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

To form the polymer, the precursor monomer may be polymerized in the presence of an oxidative catalyst (e.g., chemically polymerized). The oxidative catalyst typically includes a transition metal cation, such as iron(III), copper (II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid (e.g., p-toluene sulfonate). In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus under the designation Clevios™ C.

The oxidative catalyst and precursor monomer may be applied either sequentially or together to initiate the polymerization reaction. As an example, the monomer may initially be mixed with the oxidative catalyst to form a precursor solution. In certain embodiments, less than the normally required stoichiometric amount of the oxidative catalyst may be employed to help slow the polymerization of the monomer, creating oligomers that are shorter than if fully polymerized into a polymer to allow better penetration into the high specific charge powder. For instance, when the monomer includes a thiophene monomer (e.g., 3,4-ethylenedioxythiophene), the normally required molar ratio used to polymerize the monomer is about 1 mole of the monomer to 18 moles of the oxidative catalyst. However, less than 18 moles of oxidative polymerization catalyst can be present in the polymerization solution per mole of monomer (e.g., 3,4-ethylenedioxythiophene), such about 15 moles or less, in some embodiments from about 4 to about 12 moles, and in some embodiments, from about 5 to about 10 moles.

In addition to a monomer, oxidative catalyst, and optional dopant, the polymerization solution may also contain other components, such as one or more solvents. Particularly suitable solvents may include, for instance, water, alcohols (e.g., methanol, ethanol, n-propanol, iso-propanol, and butanol); glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); triglycerides; ketones; esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth, as well as mixtures of any of the foregoing (e.g., water and alcohol).

The polymerization solution is typically kept at a relatively low temperature during the reaction, such as from about −20° C. to about 50° C., in some embodiments from about −15° C. to about 30° C., and in some embodiments, from about −10° C. to about 10° C. The solution may be applied to the anode body using any suitable application technique known in the art, such as screen-printing, dipping, electrophoretic coating, and spraying. Regardless of the application technique employed, the monomer will generally begin to react once present on the anode body to form a polymer layer. The time period during which the monomer is allowed to react on the anode body is typically long enough to allow good impregnation of the polymer into the small pores of the high specific charge powder. In most embodiments, for instance, this time period ("impregnation time") is about 1 minute or more, in some embodiments about 1.5 minutes or more, and in some embodiments, from about 2 to about 5 minutes. After the reaction, the resulting conductive polymer layer(s) may be contacted with a washing solution to remove various byproducts, excess catalysts, and so forth. The time period in which the washing solution is placed into contact with the conductive polymer layer(s) ("washing time") is typically long enough to ensure that the byproducts, excess catalyst, etc., can be adequately removed from the small pores of the high specific charge powder. The washing time period may, for example, be about 25 minutes or more, in some embodiments about 30 minutes or more, and in some embodiments, from about 45 minutes to about 90 minutes. During this time period, washing may occur in a single step or in multiple steps in which the total time of each step is within the range noted above. The washing solution may vary as desired, but typically one or more solvents (e.g., water, alcohol, etc.) and optionally a dopant, such as described above.

Once washed, the conductive polymer layer(s) may be dried, typically at a temperature of about 15° C. or more, in some embodiments about 20° C. or more, and in some embodiments, from about 20° C. to about 80° C. The polymer layer(s) may also be healed after formation. Healing may occur after each application of a conductive polymer layer or may occur after the application of the entire conductive polymer coating. In some embodiments, the conductive polymer can be healed by dipping the anode body into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol).

In the process described above, the conductive polymers are generally formed "in situ" on the anode body. Of course, this is by no means required. In other embodiments, for example, the conductive polymer may be pre-polymerized. In one embodiment, for example, the pre-polymerized polymer is an intrinsically conductive polymer that has a positive charge located on the main chain that is at least partially compensated by anions covalently bound to the polymer. Such polymers may, for example, have a relatively high specific conductivity, in the dry state, of about 1 Siemen per centimeter ("S/cm") or more, in some embodiments about 10 S/cm or more, in some embodiments about 25 S/cm or more, in some embodiments about 40 S/cm or more, and in some embodiments, from about 50 to about 500 S/cm. One example of a suitable intrinsically conductive thiophene polymer may have repeating units of the following formula (III):

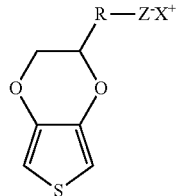

(III)

wherein,
R is $(CH_2)_a$—O—$(CH_2)_b$-L, where L is a bond or HC($[CH_2]_cH$);
a is from 0 to 10, in some embodiments from 0 to 6, and in some embodiments, from 1 to 4 (e.g., 1);
b is from 1 to 18, in some embodiments from 1 to 10, and in some embodiments, from 2 to 6 (e.g., 2, 3, 4, or 5);
c is from 0 to 10, in some embodiments from 0 to 6, and in some embodiments, from 1 to 4 (e.g., 1);
Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;
X is a cation, such as hydrogen, an alkali metal (e.g., lithium, sodium, rubidium, cesium or potassium), ammonium, etc.

In one particular embodiment, Z in formula (III) is a sulfonate ion such that the intrinsically conductive polymer contains repeating units of the following formula (IV):

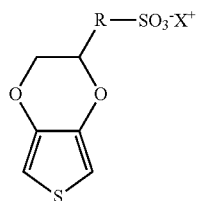

(IV)

wherein, R and X are defined above. In formula (III) or (IV), a is preferably 1 and b is preferably 3 or 4. Likewise, X is preferably sodium or potassium.

If desired, the polymer may be a copolymer that contains other types of repeating units. In such embodiments, the repeating units of formula (III) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (III). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)-1-propanesulphonic acid, salt).

In another embodiment, the intrinsically conductive polymer has repeating thiophene units of the following general formula (V):

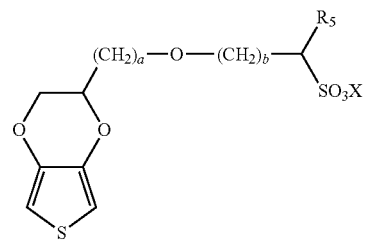

(V)

wherein,
a and b are as defined above;
$R_5$ is an optionally substituted $C_1$-$C_6$ linear or branched alkyl group (e.g., methyl) or a halogen atom (e.g., fluorine);
X is a hydrogen atom, an alkali metal (e.g., Li, Na, or K), $NH(R^1)_3$, or $HNC_5H_5$, wherein $R^1$ is each independently a hydrogen atom or an optionally substituted $C_1$-$C_6$ alkyl group.

Specific examples of thiophene compounds used to form such repeating are described in U.S. Pat. No. 9,718,905 and may include, for instance, sodium 3-[(2,3-dihydrothieno[3,4-b][1,4]dioxin-2-yl)methoxy]-1-methyl-1-propane-sulfonate, sodium 3-[(2,3-dihydrothieno[3,4-b]-[1,4]dioxin-2-yl)methoxy]-1-ethyl-1-propanesulfonate, sodium 3-[(2,3-dihydrothieno[3,4-b]-[1,4]dioxin-2-yl)methoxy]-1-propyl-1-propane-sulfonate, sodium 3-[(2,3-dihydrothieno[3,4-b]-[1,4]dioxin-2-yl)methoxy]-1-butyl-1-propanesulfonate, sodium 3-[(2,3-dihydrothieno[3,4-b]-[1,4]dioxin-2-yl)methoxy]-1-pentyl-1-propane-sulfonate, sodium 3-[(2,3-dihydrothieno[3,4-b]-[1,4]dioxin-2-yl)methoxy]-1-hexyl-1-propanesulfonate, sodium 3-[(2,3-dihydrothieno[3,4-b]-[1,4]dioxin-2-yl)methoxy]-1-isopropyl-1-propanesulfonate, sodium 3-[(2,3-dihydrothieno[3,4-b]-[1,4]dioxin-2-yl)methoxy]-1-isobutyl-1-propanesulfonate, sodium 3-[(2,3-dihydrothieno[3,4-b]-[1,4]dioxin-2-yl)methoxy]-1-isopentyl-1-propanesulfonate, sodium 3-[(2,3-dihydrothieno[3,4-b]-[1,4]dioxin-2-yl)methoxy]-1-fluoro-1-propanesulfonate, potassium 3-[(2,3-dihydrothieno[3,4-b]-[1,4]dioxin-2-yl)methoxy]-1-methyl-1-propanesulfonate, 3-[(2,3-dihydrothieno[3,4-b]-[1,4]dioxin-2-yl)methoxy]-1-methyl-1-propanesulfonic acid, ammonium 3-[(2,3-dihydrothieno[3,4-b]-[1,4]dioxin-2-yl)methoxy]-1-methyl-1-propane-sulfonate, triethylammonium 3-[(2,3-dihydrothieno[3,4-b]-[1,4]dioxin-2-yl)methoxy]-1-methyl-1-propanesulfonate, etc., as well as combination thereof and derivatives thereof. Each of the above exemplified thiophene monomers may be prepared from thieno[3,4-b]-1,4-dioxin-2-methanol and a branched sultone compound in accordance with a known method (e.g., Journal of Electroanalytical Chemistry, 443, 217 to 226 (1998)).

"Extrinsically" conductive polymers may also be employed, which generally require the presence of a separate counterion that is not covalently bound to the polymer. One example of such an extrinsically conductive polymer is poly(3,4-ethylenedioxythiophene). The counterion may be a monomeric or polymeric anion that counteracts the charge of the conductive polymer. Polymeric anions can, for example, be anions derived from polymeric carboxylic acids (e.g., poly(meth)acrylic acids, such as poly-2-sulfoethyl (meth)acrylate or poly-3-propylsulfo(meth)acrylate; polymaleic acids; etc.); polymeric sulfonic acids (e.g., polystyrene sulfonic acids ("PSS"), polyvinyl sulfonic acids, etc.); and so forth, as well as salts thereof, such as an alkali metal, alkaline earth metal, transition metal, or ammonium salt thereof. Likewise, suitable monomeric anions may be derived from $C_1$ to $C_{20}$ alkane sulfonic acids (e.g., dodecane sulfonic acid); aliphatic fluorosulfonic acids (e.g., trifluoromethane sulfonic acid, perfluorobutane sulfonic acid, perfluorooctane sulfonic acid, trifluoromethanesulfonimide, etc.); aliphatic $C_1$ to $C_{20}$ carboxylic acids (e.g., 2-ethylhexylcarboxylic acid); aliphatic fluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); cycloalkane sulfonic acids (e.g., camphor sulfonic acid); boronic compounds (e.g., tetrafluoroboric acid); phosphoric compounds (e.g., hexafluorophosphoric acid); and so forth, as well as salts thereof, such as an alkali metal, alkaline earth metal, transition metal, or ammonium salt thereof. Particularly suitable counteranions are polymeric anions, such as those derived from a polymeric carboxylic or sulfonic acid (e.g., polystyrene sulfonic acid ("PSS")). The molecular weight of such compounds typically ranges from about 1,000 to about 2,000,000, and in some embodiments, from about 2,000 to about 500,000.

Whether intrinsically or extrinsically conductive, a pre-polymerized polymer layer may be applied to the anode body in a variety of forms, such as a solution, dispersion, etc. Intrinsically conductive polymers, for example, are preferably applied in the form of a solution while extrinsically conductive polymers are preferably applied in the form of a dispersion.

When a solution is employed, the concentration of the polymer may vary depending on the desired viscosity of and the particular manner in which the layer is to be applied to the anode. Typically, however, the polymer constitutes from about 0.1 to about 10 wt. %, in some embodiments from about 0.4 to about 5 wt. %, and in some embodiments, from about 0.5 to about 4 wt. % of the solution. Solvent(s) may likewise constitute from about 90 wt. % to about 99.9 wt. %, in some embodiments from about 95 wt. % to about 99.6 wt. %, and in some embodiments, from about 96 wt. % to about 99.5 wt. % of the solution. While other solvents may certainly be employed, it is generally desired that water is the primary solvent such that the solution is considered an "aqueous" solution. In most embodiments, for example, water constitutes at least about 50 wt. %, in some embodiments at least about 75 wt. %, and in some embodiments, from about 90 wt. % to 100 wt. % of the solvent(s) employed. When employed, a solution may be applied to the anode using any known technique, such as dipping, casting (e.g., curtain coating, spin coating, etc.), printing (e.g., gravure printing, offset printing, screen printing, etc.), and so forth. The resulting conductive polymer layer may be dried and/or washed after it is applied to the anode.

When a dispersion is employed, the conductive polymer is generally in the form of pre-polymerized conductive particles. Such particles typically have an average size (e.g., diameter) of from about 1 to about 100 nanometers, in some embodiments from about 2 to about 80 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor element. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas.

The solid electrolyte may be formed from multiple layers, such as inner and/or outer layers. The term "inner" in this context refers to one or more layers that overly the dielectric, whether directly or via another layer (e.g., pre-coat layer). The inner layer(s), for example, typically contain an in-situ polymerized polymer and/or an intrinsically conductive polymer such as described above. One or multiple inner layers may be employed. For example, the solid electrolyte typically contains from 2 to 30, in some embodiments from 4 to 20, and in some embodiments, from about 5 to 15 inner layers (e.g., 10 layers). The solid electrolyte may contain only "inner layers" so that it is essentially formed from the same material, i.e., intrinsically conductive polymers and/or in situ polymerized layers. Nevertheless, in other embodiments, the solid electrolyte may also contain one or more optional "outer" conductive polymer layers that are formed from a different material than the inner layer(s) and overly the inner layer(s). For example, the outer layer(s) may be formed from a dispersion of an extrinsically conductive polymer. In one particular embodiment, the outer layer(s) are formed primarily from such extrinsically conductive polymers in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers.

E. External Polymer Coating

An external polymer coating may also be optionally employed that overlies the solid electrolyte. When employed, the external polymer coating typically contains one or more layers formed from pre-polymerized conductive polymer particles such as described above (e.g., dispersion of extrinsically conductive polymer particles). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating may have a larger size than those employed in the outer layers of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 80 to about 500 nanometers, in some embodiments from about 90 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

F. Moisture Barrier Layer

If desired, a moisture barrier layer may be employed overlies the solid electrolyte and/or optional external polymer coating. The moisture barrier layer may be formed from a variety of different materials, such as a hydrophobic elastomer, e.g., silicones, fluoropolymers, etc. Silicone polymers are particularly suitable for use in the moisture barrier layer of the present invention. Such elastomers are typically derived from polyorganosiloxanes, such as those having the following general formula:

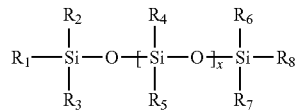

wherein,
x is an integer greater than 1; and
R$_1$, R$_2$, R$_3$, R$_4$, R$_5$, R$_6$, R$_7$, and R$_8$ are independently monovalent groups typically containing from 1 to about 20 carbon atoms, such as alkyl groups (e.g., methyl, ethyl, propyl, pentyl, octyl, undecyl, octadecyl, etc.); alkoxy groups (e.g., methoxy, ethoxy, propoxy, etc.); carboxyalkyl groups (e.g., acetyl); cycloalkyl groups (e.g., cyclohexyl); alkenyl groups (e.g., vinyl, allyl, butenyl, hexenyl, etc.); aryl groups (e.g., phenyl, tolyl, xylyl, benzyl, 2-phenylethyl, etc.); and halogenated hydrocarbon groups (e.g., 3,3,3-trifluoropropyl, 3-chloropropyl, dichlorophenyl, etc.). Examples of such polyorganosiloxanes may include, for instance, polydimethylsiloxane ("PDMS"), polymethylhydrogensiloxane, dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, fluoro-modified polysiloxane, etc. To form an elastomer, the polyorganosiloxane may be crosslinked using any of a variety of known techniques, such as by catalyst curing (e.g., platinum catalysts), room temperature vulcanization, moisture curing, etc. Crosslinking agents may be employed, such as alkoxy silanes having the formula Si—OR, wherein R is H, alkyl (e.g., methyl), alkenyl, carboxyalkyl (e.g., acetyl), and so forth.

In addition to being hydrophobic, it is generally desired that the material used to form the moisture barrier layer has a relatively low modulus and a certain degree of flexibility, which can help absorb some of the thermal stresses caused by expansion of the casing and also allow it to be subjected to compressive forces. The flexibility of the material may be characterized by a corresponding low modulus of elasticity ("Young's modulus"), such as about 5,000 kilopascals ("kPa") or less, in some embodiments from about 1 to about 2,000 kPa, and in some embodiments, from about 2 to about 500 kPa, measured at a temperature of about 25° C. The material also typically possesses a certain degree of strength that allows it to retain its shape even when subjected to compressive forces. For example, the material may possess a tensile strength of from about 1 to about 5,000 kPa, in some embodiments from about 10 to about 2,000 kPa, and in some embodiments, from about 50 to about 1,000 kPa, measured at a temperature of about 25° C. With the conditions noted above, the hydrophobic elastomer can even further enhance the ability of the capacitor to function under extreme conditions.

To help achieve the desired flexibility and strength properties, a non-conductive filler may be employed in the moisture barrier layer. When employed, such additives typically constitute from about 0.5 wt. % to about 30 wt. %, in some embodiments from about 1 wt. % to about 25 wt. %, and in some embodiments, from about 2 wt. % to about 20 wt. % of the moisture barrier layer. The silicone elastomer may constitute from about 70 wt. % to about 99.5 wt. %, in some embodiments from about 75 wt. % to about 99 wt. %, and in some embodiments, from about 80 wt. % to about 98 wt. % of the moisture barrier layer. One particular example of such a filler includes, for instance, silica. While most forms of silica contain a relatively hydrophilic surface due to the presence of silanol groups (Si—OH), the silica may optionally be surface treated so that its surface contains $(CH_3)_n$—Si— groups, wherein n is an integer of 1 to 3, which further enhances the hydrophobicity of the moisture barrier layer. The surface treatment agent may, for example, be an organosilicon compound monomer having a hydrolyzable group or a partial hydrolyzate thereof. Examples of such compounds may include organosilazanes, silane coupling agents such as described above, etc.

The moisture barrier layer may be applied to any surface of the capacitor to provide the desired properties. For example, the moisture barrier layer may be located on the top, bottom, and/or side surfaces of the capacitor. The moisture barrier layer may likewise be located on the front and/or rear surface of the capacitor. The moisture barrier layer may cover the entire area or only a portion of the area of the surface to which it is applied. In one embodiment, for example, the moisture barrier layer covers about 30% or more, in some embodiments about 40% or more, and in some embodiments, about 50% or more of a surface of the capacitor to which it is applied.

G. Other Optional Components

If desired, the capacitor element may also contain other layers as is known in the art. For example, an adhesive layer may optionally be formed between the dielectric and solid electrolyte. The adhesive layer may, for instance, be present between the dielectric and pre-coat layer and/or between the pre-coat layer and the solid electrolyte. Regardless, the adhesive layer is typically formed from a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1\times10^5$ Ω·cm, and in some embodiments, greater than about $1\times10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other adhesive layer materials are described in more detail U.S. Pat. No. 6,674,635 to Fife, et al.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte. Various techniques may be employed to apply such layers, such as dipping, brushing, spraying, printing, etc.

II. Terminations

Once formed, the capacitor element may be provided with terminations. As noted above, the capacitor generally contains at least two separate and spaced apart anode terminations to which individual exposed anode lead portions are electrically connected. The capacitor also contains a cathode termination to which the solid electrolyte of the capacitor element is electrically connected.

Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer. The terminations may be connected to the capacitor element using any technique known in the art, such as resistance welding, laser welding, conductive adhesives, etc.

Figure 2:
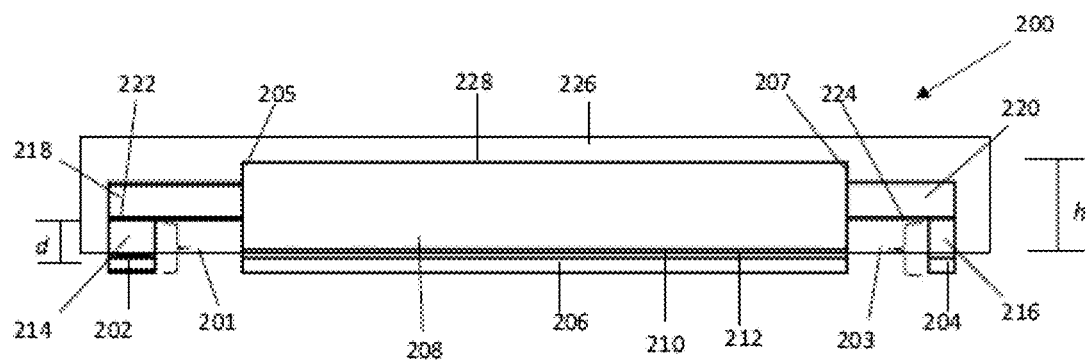
FIG. 2 is a side view of one embodiment of a capacitor according to the present invention.
Figure 3:
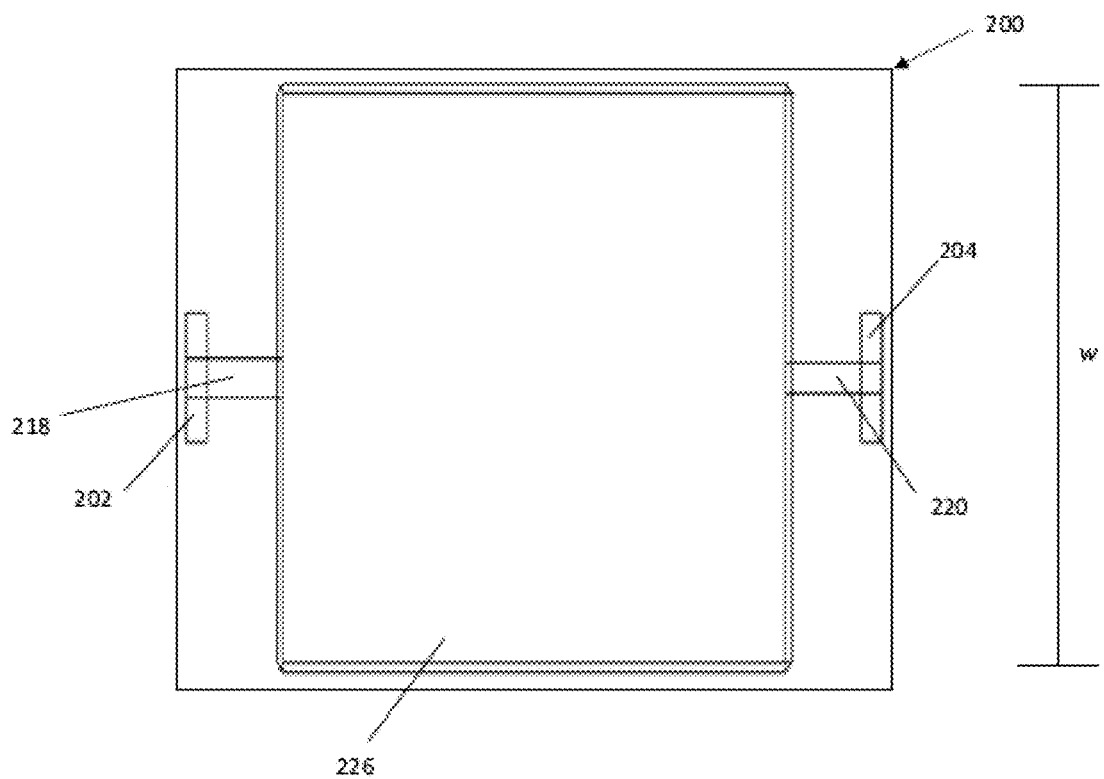
FIG. 3 is a top view of the capacitor of FIG. 2.

Referring to FIGS. 2-3, one particular embodiment of a capacitor 200 is shown that contains a cathode termination 206 in electrical connection with the solid electrolyte (not shown) of a capacitor element 208. The capacitor element 208 may contain opposing first and second ends 205 and 207, as well as an opposing lower surface 210 and upper surface 228. The cathode termination 206 is generally planar in the sense that it is formed primarily, if not entirely, from components that extend in the same or substantially the same plane. The cathode termination 206 is positioned adjacent to the lower surface 210 of the capacitor element 208 and is generally parallel thereto. In this particular embodiment, a conductive adhesive 212 connects the cathode termination 206 to the capacitor element 208. The conductive adhesive 212 may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Publication No. 2006/0038304 to Osako, et al. Any of a variety of techniques may be used to apply the conductive adhesive to the cathode termination 206. Printing techniques, for instance, may be employed due to their practical and cost-saving benefits. The conductive adhesive 212 can be cured. For example, a heat press may be used to apply heat and pressure to ensure that the capacitor element 208 is adequately adhered to the cathode termination 206 by the adhesive.

The capacitor 200 also includes a first exposed anode lead portion 218 extending from a first end 205 of capacitor element 208 and a second exposed anode lead portion 220 extending from a second opposing end 207 of the capacitor element 208. The exposed anode lead portion 218 is electrically connected to a first anode termination 201 and the exposed anode lead portion 220 is electrically connected to a second anode termination 203. The first anode termination 201 may include a planar portion 202 that is generally parallel with the lower surface 210 of the capacitor element 208 and/or the cathode termination 206. The first anode termination 201 may also contain an upstanding portion 214 that connects the planar portion 202 to the exposed first anode lead portion 218. Likewise, the second anode termination 203 may include a planar portion 204 that is generally parallel with the lower surface 210 of the capacitor element 208 and/or the cathode termination 206. The second anode termination 203 may also contain an upstanding portion 216 that connects the planar portion 204 to the exposed second anode lead portion 220. As noted, the planar portions 202, 204 of the respective anode terminations are planar and generally parallel with the lower surface 210 of the capacitor element 208, and may therefore be located below the respective exposed anode lead portions 218, 220. However, in one embodiment, the first upstanding portion 214, and second upstanding portion 216 may be a thickened or extended portion of the first planar portion 202 and/or second planar portion 204 of the respective anode termination 201, 203. For instance, in one embodiment, the first and/or second anode termination 201, 203 has a height selected based upon a distance "d" from a bottom surface 222, 224 of the exposed anode lead portions 218, 220 to the lower surface 210 of the capacitor element, where the distance "d" typically ranges from about 0.1 to about 1 millimeter, in some embodiments from about 0.2 to about 0.8 millimeters, and in some embodiments, from about 0.3 to about 0.6 millimeters. Of course, the planar portions 202, 204 may also have a height equivalent to the distance "d" such that no upstanding portions are needed. Although not depicted in FIGS. 2-3, the upstanding portions 214, 216 may possess a "U-shape" to further enhance surface contact and mechanical stability of the exposed anode lead portions 218, 220.

The first exposed anode lead portion 218 and second exposed anode lead portion 220 may be electrically connected to the respective anode termination 201, 203 (either directly to planar portions 202, 204 or via upstanding portions 214, 216 as discussed above) using any technique known in the art, such as resistance welding, laser welding, conductive adhesives, etc. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. The same or different techniques may be employed for each exposed anode lead portion.

In some cases, the capacitor element 208 may have a relatively small thickness or height "h" that ranges from about 0.4 to about 1.5 millimeters, in some embodiments from about 0.5 to about 1.2 millimeters, and in some embodiments, from about 0.6 to about 1 millimeter. Particularly, in one embodiment, such a small height "h" can further decrease the distance "d", improving stability of the capacitor and further contributing towards lower ESL of the capacitor. For instance, in one aspect, the distance "d" may have a value based upon the height "h." In such an aspect, the distance "d" may have a distance that is about 0.1 times the height "h", such as about 0.2 times, such as about 0.3 times, such as about 0.4 times, such as about 0.5 times the height "h", decreasing the length of the leads and terminations. The capacitor element 208 may also have a high aspect ratio (ratio of the width "w" of the capacitor element to the height "h"), due at least in part to the small thickness discussed above. Such high aspect ratios may be about 2 or greater, such as about 3 or greater, such as about 4 or greater, such as about 5 or greater, such as about 6 or greater. Particularly, as discussed above, the present inventors have found that a capacitor having such a shape and orientation can further contribute to the low ESL properties of the capacitor, as well as forming a small, low profile capacitor.

III. Housing

The capacitor element is generally encapsulated within a housing so that at least a portion of the planar portion of the first anode termination, the planar portion of the second anode termination, and cathode termination are exposed for mounting onto a circuit board. Referring again to FIGS. 2-3, for instance, the capacitor element 208 may be encapsulated within a housing 226 so that at least a lower surface of the planar portion 202 of the anode termination 201, the planar portion 204 of the anode termination 203, and/or the planar cathode termination 206 are exposed. In some cases, only these surfaces are exposed. The housing is typically formed from a thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable. Still other additives may also be employed, such as photoinitiators, viscosity modifiers, suspension aiding agents, pigments, stress reducing agents, non-conductive fillers, stabilizers, etc. For example, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

The present invention may be better understood by reference to the following examples.

Test Procedures

S-Parameters

Figure 4:
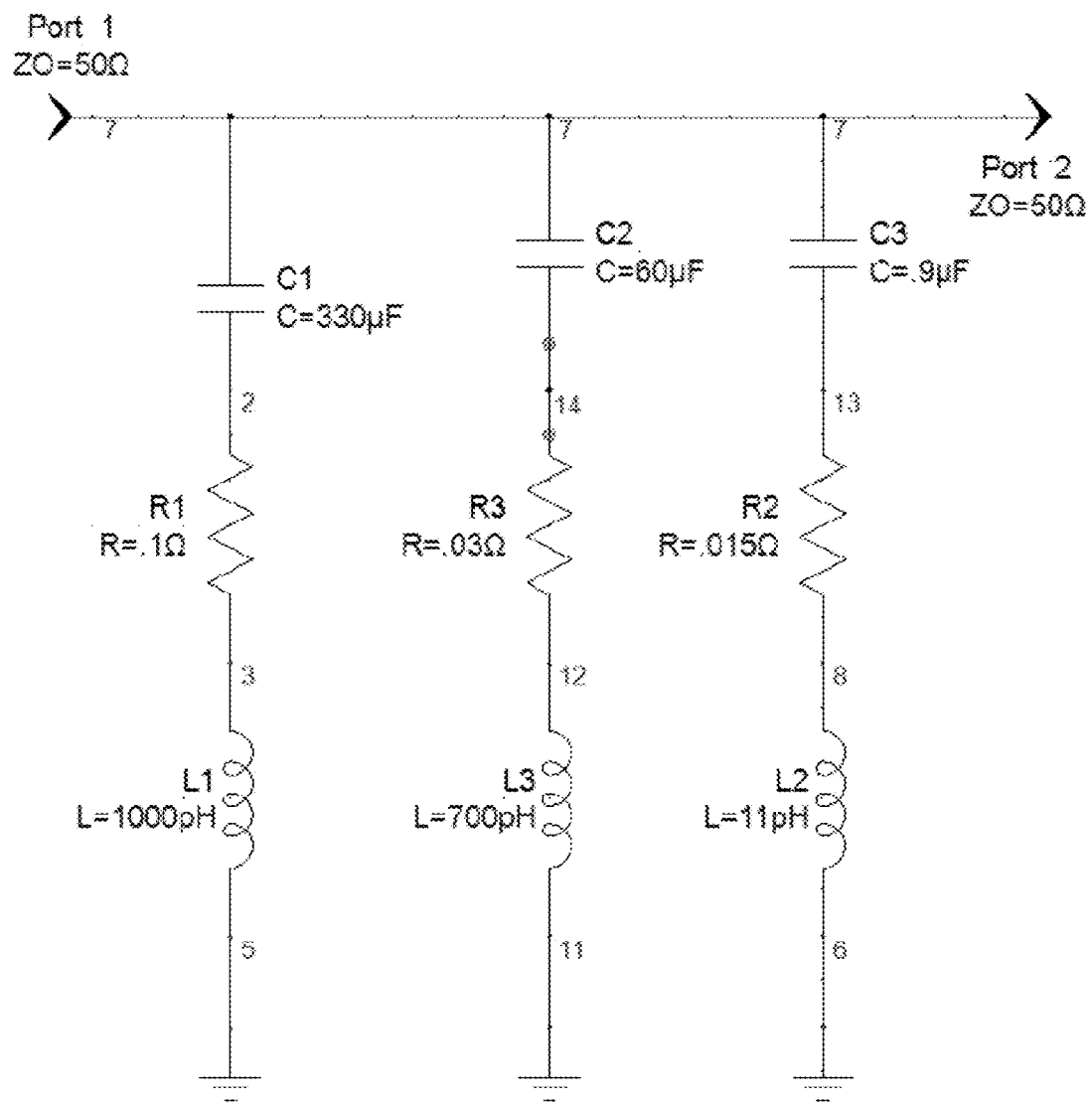
FIG. 4 is an exemplary equivalent circuit used in Example 1.

The $S_{21}$ parameter was measured using a Vector Network Analyzer over a variety of frequencies. The parameter was also modeled using the equivalent circuit shown in FIG. 4.

Impedance

Impedance was measured using a Vector Network Analyzer over a variety of frequencies.

Equivalent Series Resistance (ESR)

Equivalence series resistance may be measured using a HP4284A LCR meter with Kelvin Leads with 0 volt DC bias and 10 mVAC signals. The operating frequency was 100 kHz and the temperature was 23° C.±2° C. The ESR may be measured through the cathode termination and one or more of the anode terminations. When multiple anode terminations are used, an average ESR may be reported.

Dissipation Factor

The dissipation factor may be measured using a LCZHP4284A LCR meter with Kelvin Leads with 0 volt DC bias and 10 mVAC signals. The operating frequency may be 120 Hz and the temperature may be 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature may be 23° C.±2° C.

Leakage Current

Leakage current may be measured using a leakage test meter (YHP4140B) at a temperature of 23° C.±2° C., with 1 kOhm resistor to limit charging current and at the rated voltage (e.g., 2.5 V) after a minimum of 5 minutes.

Example 1

70,000 μFV/g tantalum powder was used to form anode samples. Each anode sample was embedded with a tantalum wire and pressed to a density of 6.0 g/cm³. The resulting pellets had a size of 5.08×3.52×0.52 mm. The pellets were sintered at 1,275° C. and then second tantalum wire was attached to the opposing end of the pellet (FIG. 1A) by welding. Upon lead welding, the pellets were deoxidized at 860° C. and sintered again at 1300° C. The pellets were anodized to 9.3 volts in water/phosphoric acid electrolyte at a temperature of 80° C. to form the dielectric layer. A conductive polymer coating was then formed by dipping the anode into a butanol solution of iron (Ill) toluenesulfonate (Clevios™ C, Heraeus) and consequently into 3,4-ethylenedioxythiophene (Clevios™ M, Heraeus) and polymerized. After 45 minutes of polymerization, a thin layer of poly(3,4-ethylenedioxythiophene) was formed on the surface of the dielectric. The anode was washed in 2% water solution of p-toluenesulphonic acid and subsequently in butanol to remove reaction by-products, anodized in a liquid electrolyte, and washed again in deionized water. This process was repeated 6 times. Thereafter, the parts were dipped into a dispersed poly(3,4-ethylenedioxythiophene) having a solids content of 2.0% and viscosity 20 mPa·s (Clevios™ K, Heraeus). Upon coating, the parts were dried at 125° C. for 20 minutes. This process was repeated 3 times. Thereafter, the parts were dipped into a dispersed poly(3,4-ethylenedioxythiophene) having a solids content of 2.0% and viscosity 160 mPa·s (Clevios™ K, Heraeus). Upon coating, the parts were dried at 125° C. for 20 minutes. This process was repeated 14 times. The parts were then painted with a graphite dispersion and dried. The parts were then painted with a silver dispersion and dried. Finally, the parts were mounted on the substrate with terminations as described herein and shown in FIG. 1A.

Multiple parts (12) of 220 μF/2.5V capacitors were made in this manner and encapsulated in a standard silica epoxy resin. The resulting parts were then tested for various electrical properties. The results are provided in the table below.

|  | Example 1 |
| --- | --- |
| Capacitance (μF) | 247.4 |
| DF (%) | 1.5 |
| ESR 1* (mOhm) | 33.9 |
| ESR 2† (mOhm) | 32.6 |
| Average ESR (mOhm) | 33.3 |
| Leakage Current (μA) | 142.0 |

*A measured part contacted on the first anode termination and cathode termination.
†A measured part contacted on the second anode termination and cathode termination.

Figure 5:
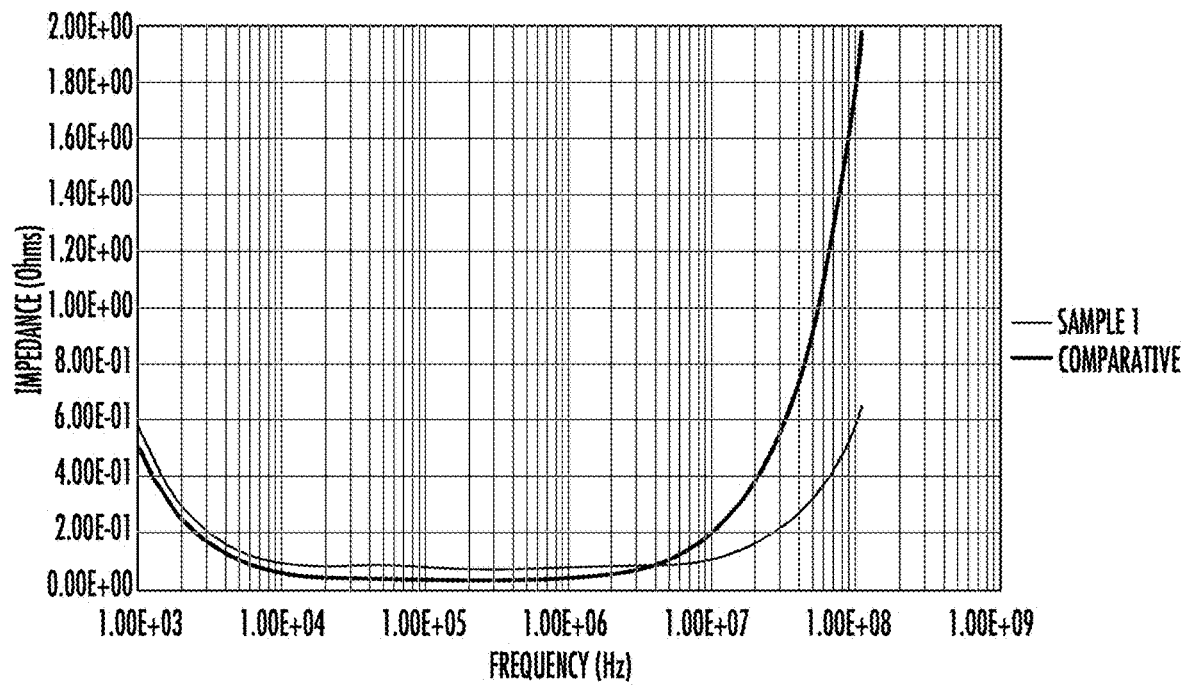
FIG. 5 is a graphical illustration of impedance versus frequency for Example 1 as compared to a standard capacitor.
Figure 6:
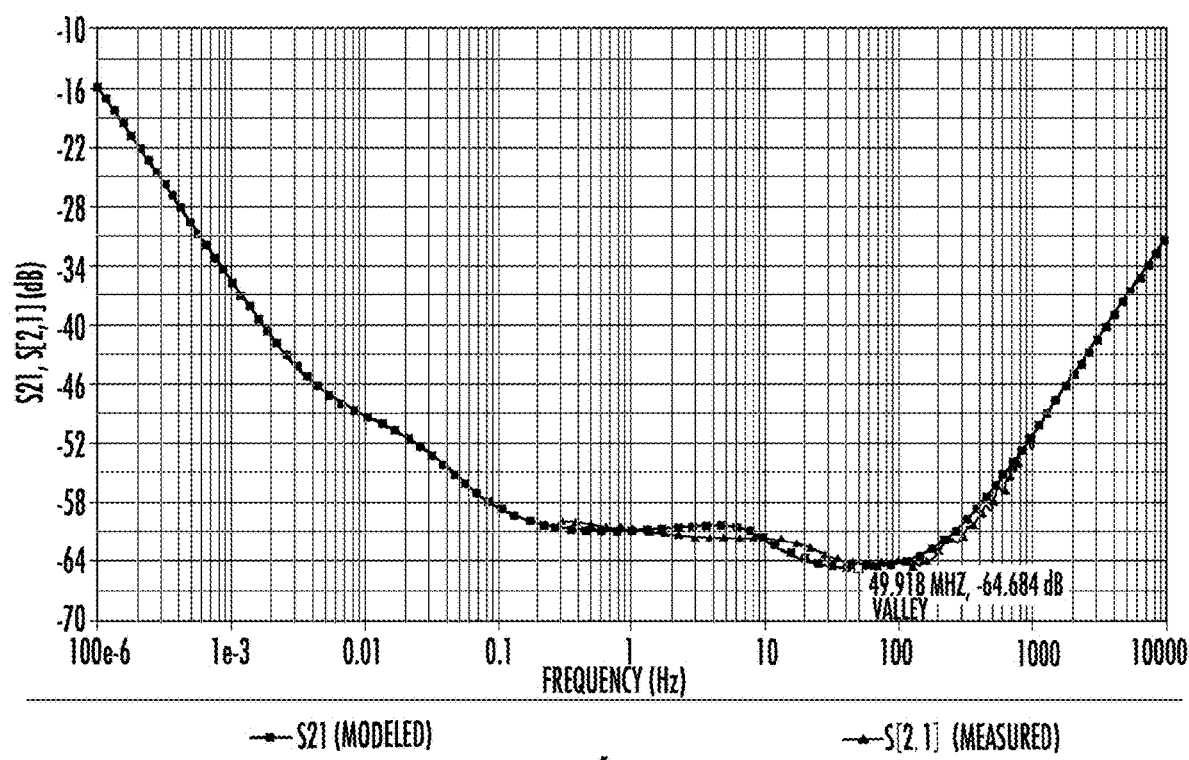
FIG. 6 is a graphical representation of $S_{21}$ parameters that were modeled and measured over a broad range of frequencies for Example 1.

The capacitor of Example 1 was also tested for impedance at a variety of frequencies. FIG. 5 provides a graphical representation of the absolute value of the impedance (|Z|) versus frequency of Example 1 as compared to a standard capacitor ("Comparative"). As shown, the impedance increase due to parasitic inductance associated with the capacitor is substantially reduced at higher frequencies relative to the standard capacitor. For instance, there is about a 66% reduction in impedance (parasitic inductance) at 100 MHz such that the impedance is lower than 0.7 ohms. FIG. 6 also shows the modeled and measured insertion loss scattering parameters ($S_{21}$) for Example 1. As shown, the capacitor exhibited high attenuation over a broad frequency range, such as greater than about 50 dB over a frequency range of from about 0.1 MHz to about 500 MHz. Moreover, even at the high frequency range of 500 MHz to 10 GHz, the capacitor still maintained an attenuation of greater than about 30 dB, which allows it to be readily employed in DC power filtering applications.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
    a capacitor element comprising a sintered anode body that includes tantalum, a dielectric that overlies the anode body that includes tantalum pentoxide, a solid electrolyte that overlies the dielectric, and an external coating that overlies the solid electrolyte, wherein the solid electrolyte includes an inner layer that contains an in-situ polymerized conductive polymer and/or an intrinsically conductive polymer and an outer layer containing pre-polymerized conductive polymer particles, and further wherein the external coating includes pre-polymerized conductive polymer particles, wherein the capacitor element defines opposing first and second ends and opposing upper and lower surfaces;
    a first exposed anode lead portion extending from the first end of the capacitor element;
    a first anode termination that is electrically connected to the first exposed anode lead portion;
    a second exposed anode lead portion extending from the second end of the capacitor element;
    a second anode termination that is spaced apart from the first anode termination and electrically connected to the second exposed anode lead portion;
    a housing leaving exposed only a lower surface of the first anode termination, the second anode termination, or both; and
    a planar cathode termination that is positioned adjacent to the lower surface of the capacitor element and electrically connected to the solid electrolyte, wherein the housing encloses the capacitor element, leaving exposed only a lower surface of the cathode termination;
    wherein a continuous anode lead extends through the first end and the second end of the capacitor element, thereby defining the first exposed anode lead portion and the second exposed anode lead portion, wherein the exposed lower surface of the planar cathode termination is generally in the same plane as the exposed lower surface of the first anode termination and the second anode termination, and wherein a distance between the first exposed anode lead portion and the second exposed anode lead portion to the lower surface of the capacitor element ranges from about 0.1 millimeters to about 1 millimeter.

2. The solid electrolytic capacitor of claim 1, wherein the first anode termination, the second anode termination, or both include a planar portion that is generally parallel with a lower surface of the capacitor element.

3. The solid electrolytic capacitor of claim 1, wherein the first anode termination, the second anode termination, or both include a planar portion that is substantially in the same plane as the cathode termination.

4. The solid electrolytic capacitor of claim 1, wherein the cathode termination is generally parallel with a lower surface of the capacitor element.

5. The solid electrolytic capacitor of claim 1, wherein the anode body is formed from a valve metal powder having a specific charge of from about 5,000 to about 100,000 μF*V/g.

6. The solid electrolytic capacitor of claim 1, wherein the anode body is formed from a valve metal powder having a specific charge of from about 100,000 to about 600,000 μF*V/g.

7. The solid electrolytic capacitor of claim 1, wherein the capacitor exhibits an impedance of about 1 ohm or less over a frequency range of from about 1 kHz to about 100 MHz.

8. The solid electrolytic capacitor of claim 1, wherein the solid electrolytic capacitor exhibits about 40 dB or more of attenuation ($S_{21}$ parameter) over a frequency range of from about 0.1 MHz to about 500 MHz.

9. The solid electrolytic capacitor of claim 1, wherein the solid electrolytic capacitor exhibits about 20 dB or more of attenuation ($S_{21}$ parameter) over a frequency range of from about 500 MHz to about 10 GHz.

10. The solid electrolytic capacitor of claim 1, wherein the capacitor exhibits an ESR of about 800 mohms or less, as determined at an operating frequency of 100 kHz and temperature of 23° C.

11. The solid electrolytic capacitor of claim 1, wherein the capacitor has an anode length of from about 1.5 millimeters to about 6 millimeters.

12. The solid electrolytic capacitor of claim 1, wherein the capacitor has an anode length of from about 2 millimeters to about 5 millimeters.

13. The solid electrolytic capacitor of claim 1, wherein the in-situ polymerized conductive polymer and/or an intrinsically conductive polymer of the inner layer includes poly (3,4-ethylenedioxythiophene) or a derivative thereof.

14. The solid electrolytic capacitor of claim 1, wherein the pre-polymerized particles of the outer layer and/or the external coating include poly(3,4-ethylenedioxythiophene), or a derivative thereof.

15. The capacitor element of claim 1, wherein the distance ranges from about 0.2 millimeters to about 0.8 millimeters.

16. The capacitor element of claim 1, wherein the distance ranges from about 0.3 millimeters to about 0.6 millimeters.

17. The capacitor element of claim 1, wherein the entire continuous anode lead extends in the same plane.

* * * * *